United States Patent [19]

Schluger

[11] Patent Number: 5,682,990
[45] Date of Patent: Nov. 4, 1997

[54] CD HOLDER FOR CD JEWEL BOX

[76] Inventor: Allen Schluger, 21 West 68th St., New York, N.Y. 10023

[21] Appl. No.: 745,853

[22] Filed: Nov. 8, 1996

[51] Int. Cl.⁶ .................................................. B65D 85/30
[52] U.S. Cl. .................................. 206/308.1; 206/387.13; 206/472; 53/169; 53/462; 281/36; 281/38; 402/79; 493/356; 493/946
[58] Field of Search ............................... 206/308.1, 307, 206/309-313, 387.13, 472, 232; 281/29, 36, 38; 402/79; 53/169, 174, 207, 461, 462; 493/946, 82, 390, 397, 356

[56] References Cited

U.S. PATENT DOCUMENTS

| | | | |
|---|---|---|---|
| 2,439,868 | 4/1948 | Segal | 206/311 |
| 4,778,047 | 10/1988 | Lay | 206/311 |
| 4,844,260 | 7/1989 | Jaw | 206/311 |
| 5,193,681 | 3/1993 | Lievsay | 206/311 |
| 5,513,914 | 5/1996 | Faber | 281/38 |
| 5,620,271 | 4/1997 | Bergh et al. | 206/308.1 |

*Primary Examiner*—Paul T. Sewell
*Assistant Examiner*—Luan K. Bui
*Attorney, Agent, or Firm*—Myron Amer PC

[57] ABSTRACT

An assemblage of a "jewel box"-packaged CD and a point-of-sales cardboard holder in the use of which holder a CD replicator loads the CD through a front opening into an internal box-like configuration having an interposed position between an external book-like configuration, and wherein both mentioned configuration components of the holder are adapted to advantageously be shipped flat to the replicator's facility to facilitate transportation and storage handling, and wherein further the flat condition is the result of not closing a rear opening of the box-like configuration which has no adverse consequence because a spine means of the book-like configuration serves as a closure for this rear opening when used in its intended book mode.

3 Claims, 2 Drawing Sheets

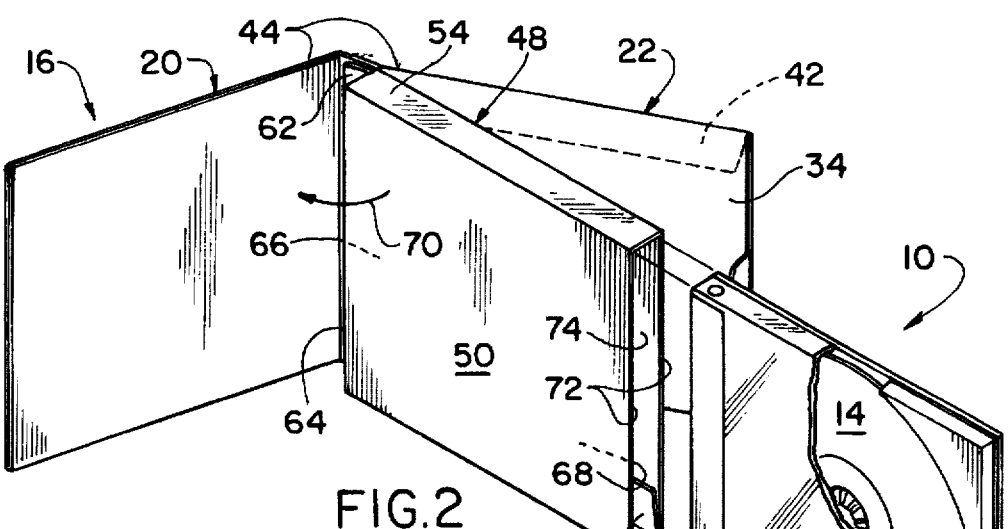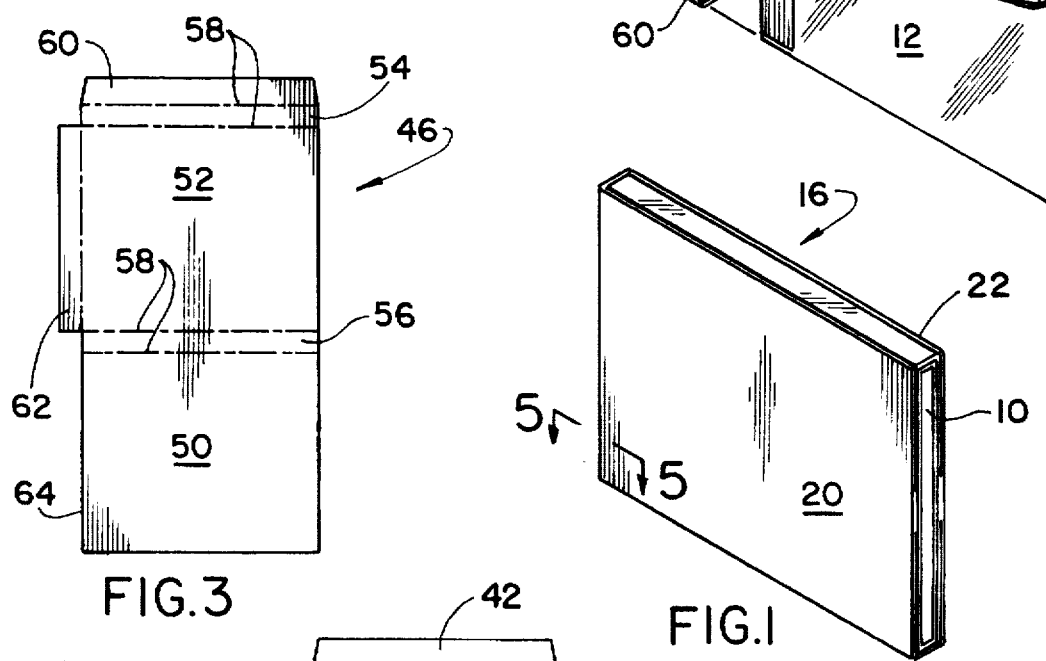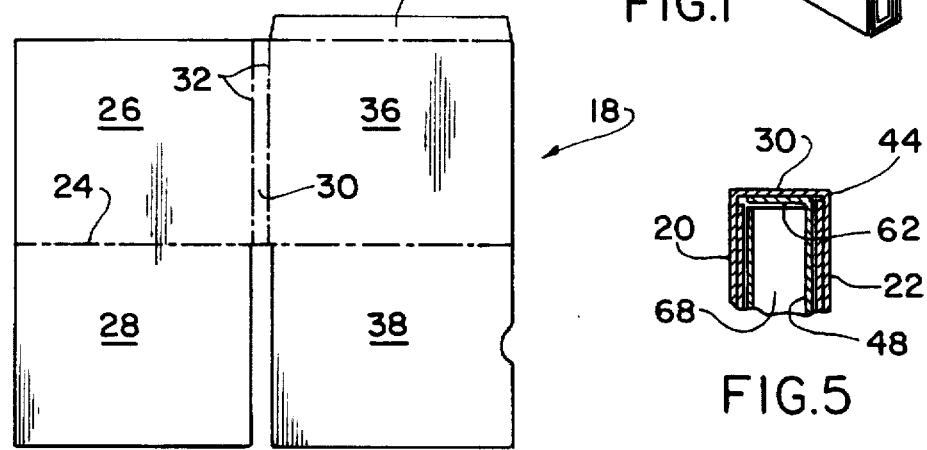

CD HOLDER FOR CD JEWEL BOX

The present invention relates generally to improvements for a compact disc ("CD") holder, the improvements more particularly facilitating use of the holder of a point-of-sales in conjunction with the CD in a popularly-used commercial package.

EXAMPLE OF THE PRIOR ART

In my prior U.S. Pat. No. 5,518,488, issued for "CD Holder of Cardboard and Method of Construction" on May 21, 1996, a popular commercial packaging of the CD, known as a "jewel box", is disclosed, and the '488 patent relates to as a biodegradable cardboard substitute for the plastic "jewel box". This complete substitution, while environmentally-friendly, obviates use of existing apparatus for loading the CD in the standardized sized and shaped "jewel box" and consequently has this business drawback. The combined use of an exterior cardboard box-like holder and a jewel box-packaged CD stored internally thereof is a desirable solution, but as yet has not been forthcoming because of the difficulties in the handling of these two distinct packaging components, as well as the attendant additional expense. The additional expense, if limited to the cost of the holder and reduced to a nominal amount in the handling thereof in the combined commercial package, would be warranted since the cardboard holder can be used to advantage to display information-conveying text related to the CD to favorably induce a point-of-sales purchase.

Broadly, it is an object of the present invention to provide a cardboard holder/CD jewel box combination point-of-sales commercial package overcoming the foregoing and other shortcomings of the prior art.

More particularly, it is an object to facilitate the loading of the jewel box-packaged CD in a cardboard holder package component, and to facilitate the separate shipment at nominal cost of these package components to a packaging facility, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of a closed CD holder in its point-of-sales condition;

FIG. 2 is another perspective view but illustrating the CD holder in an open condition and being prepared for use at a point-of-sales by receiving therein a commercially packaged CD;

FIGS. 3 and 4 are plan views, on a reduced scale, of die cut blanks used in fabricating a box-like configuration (FIG. 3) and a book-like configuration (FIG. 4) used in the assembly of the holder;

FIG. 5 is a partial sectional view, as taken along line 5—5 of FIG. 1, illustrating details of the assembly of the FIG. 3 and 4 configurations;

Figure 6:
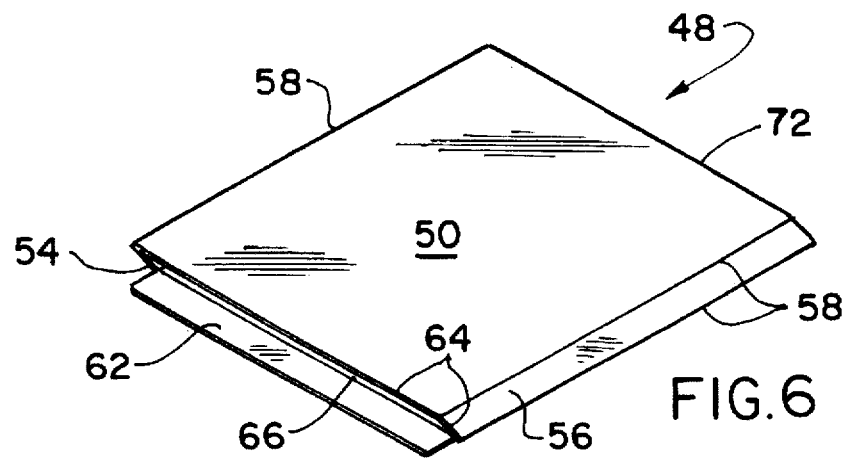
FIG. 6 is an isolated plan view of a completed box-like configuration of FIG. 3 shown in the flat.

As is readily understood from FIGS. 1 and 2, a known commercially packaged compact disc or CD, designated 10, popularly called a "jewel box" and consisting of a hard plastic box-like container 12 in which the CD 14 is stored, and which jewel box is noted of record in U.S. Pat. No. 5,085,318 issued to Kathy L. Levenick on Feb. 4, 1992, is desirably prepared for point-of-sales display as shown in FIG. 1, by the insertion of the jewel box or commercially packaged CD 10 in a holder, generally designated 16. The procedure by which the packaged CD 10 is assembled into a holder 16 is typically left to a CD replicator, who replicates the CD 14, places the CD 14 in the jewel box container 12, and inserts the packaged CD 10 into a cooperating holder 16.

To the above end, it is desirable that the holders, as exemplified by holder 16 be capable of being shipped flat to the replicator, thereby facilitating the transportation thereof, and also their storage preparatory to use. At the facility of the replicator, a flat holder 16 must be readily unfolded into its three dimensional configuration, as shown in FIG. 2, to facilitate carrying out the insertion or loading of the holder 16 with a commercially packaged CD 10.

The construction of the holder 16 achieves the foregoing and other noteworthy benefits. The construction uses a die cut cardboard blank 18, as shown in FIG. 4, providing a front cover and a rear cover designated respectively 20 and 22 in FIGS. 1, 2, that result for the front cover 20 from the folding in superposed relation about a fold line 24 of panels 26 and 28 adhesively secured to each other. A spine panel 30 delineated by fold lines 32 extends in spanning relation from panel 26 to a pouch designated 34 in FIGS. 1, 2, which pouch is formed by cooperating panels 36 and 38 folded in superposed relation along a fold line 40 and held together by an adhesive flap 42, such that product literature can be placed in the pouch 34. In its completed assembly, the blank 18 provides a book-like configuration and has the significant attribute of also being shipped, and thus also stored, in a flat configuration as demonstrated by the isolated illustration thereof, generally designated 44, in FIG. 7.

The construction of holder 16 also includes use of a cardboard blank 46 of FIG. 3, providing an internal box-like configuration, designated 48 in FIGS. 1, 2, formed by a front panel 50, a rear panel 52 and top and bottom panels 54 and 56 delineated by fold lines 58, and held in a box-like three dimensional configuration by an internal adhesive flap 60, as best shown in FIG. 2, but not restricted from being folded flat as illustrated in the isolated view thereof of FIG. 6. Underlying the present invention is the recognition that attaching the FIG. 6 and FIG. 7 configurations to each other must not be at the expense of preventing their folding and unfolding into flat and three dimensional conditions as needed. The solution is the provision of a laterally extending connecting flap 62 adhesively secured to the spine panel 30 and leaving unclosed panel edges 64 bounding a rear opening 66 of the CD storage compartment 68 itself bounded by the clearance positions of the panels 52 and 50. Stated otherwise, the closing of the rear opening 66 with a flap prior to shipment of the holder 16 would require a three dimensional shape. Yet at the site of use, there is no adverse consequence of the compartment rear opening 66 since as may be readily understood from FIG. 2, the closing of the holder 16 in the direction 70 positions the adhered flap 62 over the rear opening 66 and prevents any significant movement of the commercially packaged CD 10 from the storage compartment 68.

Panel edges 72 bound a box front opening 74 to facilitate loading and subsequent removal for point-of-sales perusal of the commercially packaged CD 10.

Figure 7:
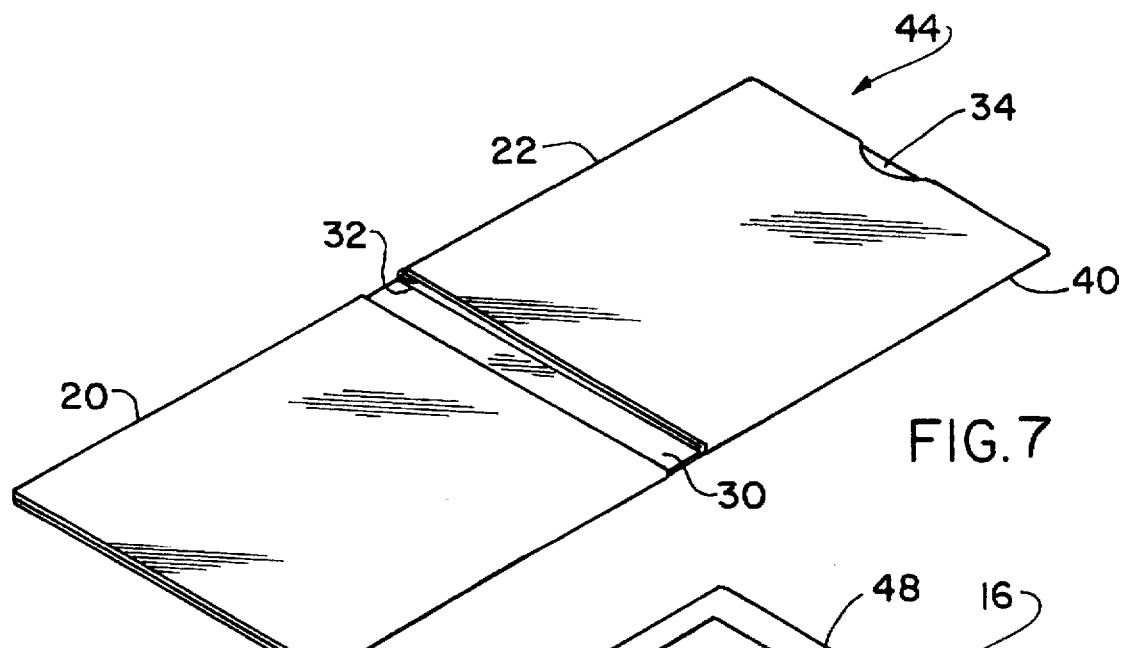
FIG. 7 is an isolated plan view of a completed book-like configuration of FIG. 4 shown in the flat.
Figure 8:
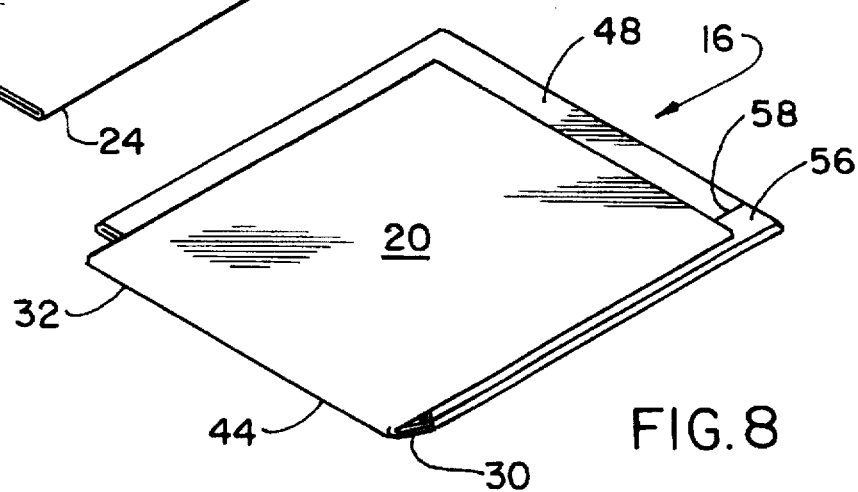
FIG. 8 is a plan view of an assembly of the FIG. 6 and FIG. 7 completed configurations, both shown in the flat in said assembled condition contributing to facilitated transport thereof.

Summarizing, FIG. 6 demonstrates an operative folded flat condition of the box means or configuration 48 incident to the front panel 50 being folded in superposed relation upon the rear panel 52 about the rearwardly disposed or outboard fold lines 58. FIG. 7 demonstrates an operative folded flat condition of the book means or book-like configuration 44, incident to the front cover 20 being folded about the adjacent or first encountered fold line 32 in the direction of the rear cover 22. Consequently, and as demonstrated in FIG. 8, the assemblage 48, 44, resulting from the adhesive attachment of the flap 62 to the spine 30, correspondingly results in a flat condition in the holder 16 to facilitate the transportation and storage thereof.

It will be understood that the exposed surfaces of the panels used in the construction of the configurations 44 and 48 can be used to advantageously display information-conveying text, and is of significant importance in the sales of the CDs to warrant coordinating the imprinted text on the panel surfaces to the CD contained within the holder.

While the CD holder herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for a point-of-sales displayed commercially packaged CD at a site of use of a type having a combined outer book-like construction providing product information and said commercially packaged CD in inserted relation within said book-like construction, said improvements comprising said outer book-like construction consisting of a front cover and a rear cover having a spine panel connected therebetween operatively effective to allow the folding thereof from a flat configuration into a book-like configuration, and a box-like construction consisting of a front panel and a rear panel interconnected by top and by bottom panels foldable into a flat configuration with said front and rear panels in contacting relation with each other and foldable into a box-like configuration with said front and rear panels in clearance positions from each other, said box-like configuration bounding a storage compartment sized and shaped to receive therein a commercially packaged CD, said front and rear panels having opposite edges in facing relation bounding a front opening into said storage compartment for loading said commercially packaged CD thereinto and a rear opening operatively effective to allow unrestricted folding movement of said box-like construction into said flat configuration, and an attaching flap extending laterally of said rear panel having an operative position adhesively secured to said spine panel incident to attaching said box-like construction in said flat configuration to said book-like configuration also in said flat configuration, whereby said book-like and box-like constructions are adapted to be transported flat to a site of use at which each is folded into three dimensional configurations providing said storage compartment and causing said attaching flap to serve as a closure for said storage compartment rear opening.

2. A cardboard CD holder comprising a book means consisting of an interconnected front panel, a spine panel delineated by spaced apart first and second fold lines, and a rear panel, a box means consisting of a front panel, a rear panel, a top panel delineated by spaced apart outboard and inboard fold lines, a bottom panel delineated by spaced apart outboard and inboard fold lines, and an adhesive flap extending laterally of said rear panel in adhesively attached relation to said spine panel to form an assemblage of said book and box means, an operative folded flat condition of said box means incident to said front panel folded in superposed relation upon said rear panel about said outboard fold lines, and an operative folded flat condition of said book means incident to said front panel folded about said first fold line in superposed relation upon said flat box means, whereby the assemblage of said book and box means has a folded flat condition to facilitate the transportation and storage thereof.

3. A method of preparing for point-of-sales display a CD of a type having a three dimensional rectangular configuration and an inserted protected position within a cardboard enclosure, said method comprising the steps of fabricating as said enclosure a first structure having a front, a rear, top and bottom panels delineated from each other by fold lines, fabricating a book-like second structure having a front panel, a rear panel and spine panel therebetween similarly delineated from each other by fold lines, positioning said first structure within said second structure in a combined point-of-sales display structure, folding in a first direction said combined point-of-sales display structure about said fold lines thereof so as to impart said combined point of sales display structure with a flat configuration, transporting plural said combined point-of-sales display structures in said flat configuration to a site of use, folding in a second opposite direction at said site of use said plural combined point-of-sales display structures about said fold lines thereof to impart thereto a three dimensional configuration, and inserting in said cardboard enclosure a cooperating said three dimensional rectangular CD, whereby said flat configuration of said combined point-of-sales display structure facilitates the transporting thereof to a site of use and the subsequent folding thereof from said flat to said three dimensional configuration facilitates imparting a three dimensional configuration to said enclosure preparatory to the inserting therein of said CD to contribute to protecting said inserted CD at said site of use against damage when used as a point-of-sales display.

* * * * *